(12) United States Patent
Lee

(10) Patent No.: US 11,581,138 B2
(45) Date of Patent: *Feb. 14, 2023

(54) MULTILAYER ELECTRONIC COMPONENT

(71) Applicant: SAMSUNG ELECTRO-MECHANICS CO., LTD., Suwon-si (KR)

(72) Inventor: Sun Cheol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,292

(22) Filed: Aug. 5, 2021

(65) Prior Publication Data

US 2021/0366655 A1    Nov. 25, 2021

Related U.S. Application Data

(63) Continuation of application No. 16/690,435, filed on Nov. 21, 2019, now Pat. No. 11,114,240.

(30) Foreign Application Priority Data

Sep. 17, 2019    (KR) .................. 10-2019-0113941

(51) Int. Cl.
*H01G 4/012*    (2006.01)
*H01G 4/232*    (2006.01)
(Continued)

(52) U.S. Cl.
CPC ........... *H01G 4/012* (2013.01); *H01G 4/1218* (2013.01); *H01G 4/232* (2013.01); *H01G 4/30* (2013.01)

(58) Field of Classification Search
CPC ...... H01G 4/012; H01G 4/1218; H01G 4/232; H01G 4/30
(Continued)

(56) References Cited

U.S. PATENT DOCUMENTS 3,740,624 A * 6/1973 McAdams, Jr. ......... H01G 4/30
361/303
4,466,045 A * 8/1984 Coleman ................ H01G 4/255
361/321.1
(Continued)

FOREIGN PATENT DOCUMENTS

CN    1153426 A    7/1997
CN    101206952 A    6/2008
(Continued)

OTHER PUBLICATIONS

Chinese Office Action dated Nov. 2, 2021, issued in corresponding Chinese Patent Application No. 202010081845.3.
(Continued)

*Primary Examiner* — Timothy J Thompson
*Assistant Examiner* — Michael F McAllister
(74) *Attorney, Agent, or Firm* — Morgan, Lewis & Bockius LLP

(57) ABSTRACT

A multilayer electronic component includes a body comprising dielectric layers, and first and second internal electrode layers alternately stacked in a stacking direction with respective dielectric layers interposed therebetween. The first internal electrode layer includes first and second internal electrodes arranged with a first spacer interposed therebetween, and the second internal electrode layer includes third and fourth internal electrodes arranged with a second spacer interposed therebetween.

18 Claims, 12 Drawing Sheets

(51) Int. Cl.
*H01G 4/30* (2006.01)
*H01G 4/12* (2006.01)

(58) Field of Classification Search
USPC .................................................... 361/306.3
See application file for complete search history.

(56) References Cited

U.S. PATENT DOCUMENTS

| | | | | |
|---|---|---|---|---|
| 4,658,328 | A * | 4/1987 | Sakabe | H01G 4/232 |
| | | | | 361/309 |
| 4,814,940 | A * | 3/1989 | Horstmann | H01G 4/012 |
| | | | | 361/309 |
| 5,892,415 | A * | 4/1999 | Okamura | H01P 7/084 |
| | | | | 333/175 |
| 5,898,562 | A * | 4/1999 | Cain | H03H 7/1783 |
| | | | | 361/328 |
| 6,385,034 | B2 * | 5/2002 | Tanaka | H01C 1/14 |
| | | | | 361/309 |
| 6,437,665 | B1 * | 8/2002 | Kato | H03H 7/1775 |
| | | | | 333/204 |
| 2003/0026059 | A1 * | 2/2003 | Togashi | H01G 4/005 |
| | | | | 361/303 |
| 2008/0144253 | A1 | 6/2008 | Togashi | |
| 2010/0103586 | A1 * | 4/2010 | Tang | H01G 4/232 |
| | | | | 361/301.4 |
| 2017/0367186 | A1 | 12/2017 | Park et al. | |
| 2019/0066921 | A1 * | 2/2019 | Cho | H01G 4/232 |

FOREIGN PATENT DOCUMENTS

| | | |
|---|---|---|
| EP | 0 774 797 A2 | 5/1997 |
| JP | H08-191034 A | 7/1996 |
| JP | H09-129467 A | 5/1997 |
| KR | 10-2015-0069889 A | 6/2015 |
| KR | 10-2016-0142035 A | 12/2016 |
| KR | 10-2017-0143315 A | 12/2017 |

OTHER PUBLICATIONS

Notice of Allowance issued in corresponding U.S. Appl. No. 16/690,435 dated Sep. 17, 2021.
Office Action issued in corresponding U.S. Appl. No. 16/690,435 dated Mar. 25, 2021.

* cited by examiner

MULTILAYER ELECTRONIC COMPONENT

CROSS-REFERENCE TO RELATED APPLICATION(S)

This application is the continuation application of U.S. patent application Ser. No. 16/690,435 filed on Nov. 21, 2019, which claims benefit of priority to Korean Patent Application No. 10-2019-0113941 filed on Sep. 17, 2019 in the Korean Intellectual Property Office, the disclosures of which are incorporated herein by reference in their entirety.

TECHNICAL FIELD

The present disclosure relates to a multilayer electronic component.

BACKGROUND

A multilayer ceramic capacitor (MLCC), a type of multilayer electronic component, may be a chip type capacitor mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacity, and relative ease of mounting. As various electronic devices such as computers, mobile devices, or the like are miniaturized and increased in terms of output, demand for miniaturization and high capacity of multilayer ceramic capacitors are increasing.

In addition, as recent interest in vehicle electric/electronic components has increased, multilayer ceramic capacitors have also come to require relatively high reliability and relatively high strength to be used in vehicle or infotainment systems.

In order to secure high capacity in multilayer ceramic capacitors, the number of stacked layers therein should be increased. However, as the number of stacked layers therein increases, delamination of the capacity forming portion and the protective layer may occur, or cracking may occur during the plasticizing process.

Accordingly, there may be a demand for development of a multilayer ceramic capacitor capable of suppressing the occurrence of delamination of the capacity forming portion and the protective layer, the occurrence of cracking, or the like.

SUMMARY

An aspect of the present disclosure is to provide a multilayer electronic component having improved mechanical strength.

An aspect of the present disclosure is to provide a multilayer electronic component having excellent reliability for moisture resistance.

An aspect of the present disclosure is to suppress occurrence of delamination of a capacity forming portion and a cover portion, occurrence of cracking, or the like.

An aspect of the present disclosure is to prevent poor contact between an internal electrode and an external electrode.

However, the objects of the present disclosure are not limited to the above description, and will be more easily understood in the process of describing specific embodiments of the present disclosure.

According to an aspect of the present disclosure, a multilayer electronic component includes a body comprising dielectric layers, and first and second internal electrode layers alternately stacked in a stacking direction with respective dielectric layers interposed therebetween, and comprising first and second surfaces opposing each other in the stacking direction, third and fourth surfaces connected to the first and second surfaces and opposing each other, and fifth and sixth surfaces connected to the first to fourth surfaces and opposing each other; and first and second external electrodes arranged on the third and fourth surfaces, respectively. The first internal electrode layer comprises first and second internal electrodes exposed from the third surface and arranged with a first spacer interposed therebetween, a first lead portion connected to the first internal electrode and exposed from the third and sixth surfaces, and a second lead portion connected to the second internal electrode and exposed from the third and fifth surfaces, and the second internal electrode layer comprises third and fourth internal electrodes exposed from the fourth surface and arranged with a second spacer interposed therebetween, a third lead portion connected to the third internal electrode and exposed from the fourth and sixth surfaces, and a fourth lead portion connected to the fourth internal electrode and exposed from the fourth and fifth surfaces.

According to another aspect of the present disclosure, a multilayer electronic component includes a body comprising dielectric layers, and first and second internal electrode layers alternately stacked in a stacking direction with respective dielectric layers interposed therebetween, and comprising first and second surfaces opposing each other in the stacking direction, third and fourth surfaces connected to the first and second surfaces and opposing each other, and fifth and sixth surfaces connected to the first to fourth surfaces and opposing each other; and first and second external electrodes arranged on the third and fourth surfaces, respectively. The first internal electrode layer comprises first and second internal electrodes arranged with a first spacer interposed therebetween, a first lead portion connected to the first internal electrode and exposed from the third and sixth surfaces, and a second lead portion connected to the second internal electrode and exposed from the fourth and fifth surfaces, and the second internal electrode layer comprises third and fourth internal electrodes arranged with a second spacer interposed therebetween, a third lead portion connected to the third internal electrode and exposed from the fourth and sixth surfaces, and a fourth lead portion connected to the fourth internal electrode and exposed from the third and fifth surfaces. The first and fourth internal electrodes are exposed from the third surface, and the second and third internal electrodes are exposed from the fourth surface.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
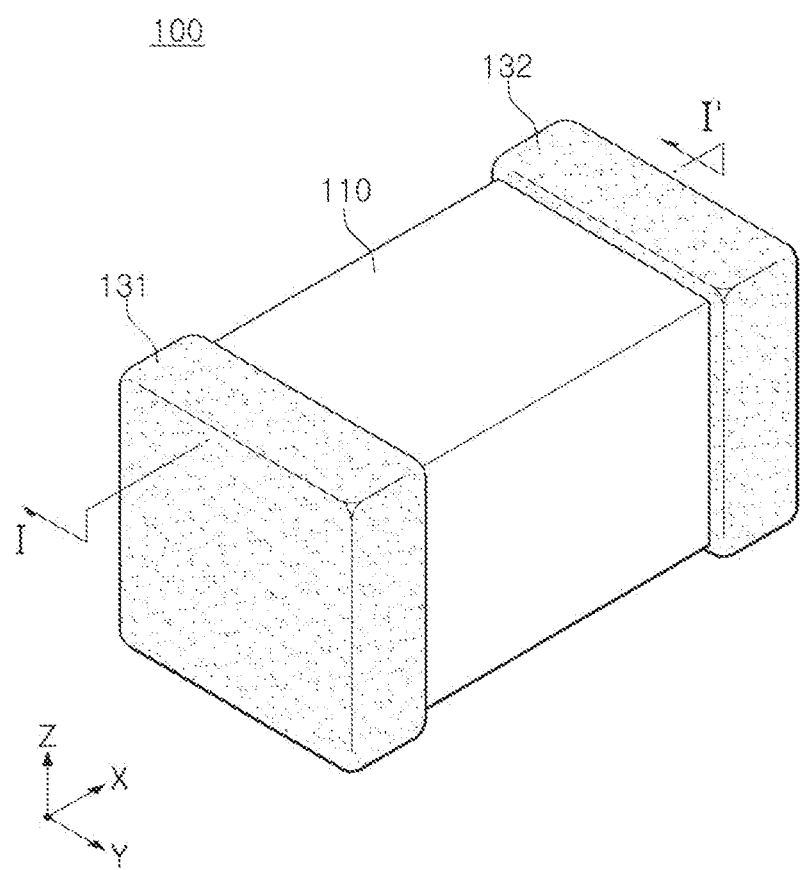
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

FIG. 1 is a perspective view schematically illustrating a multilayer electronic component according to an embodiment of the present disclosure.

Figure 2:
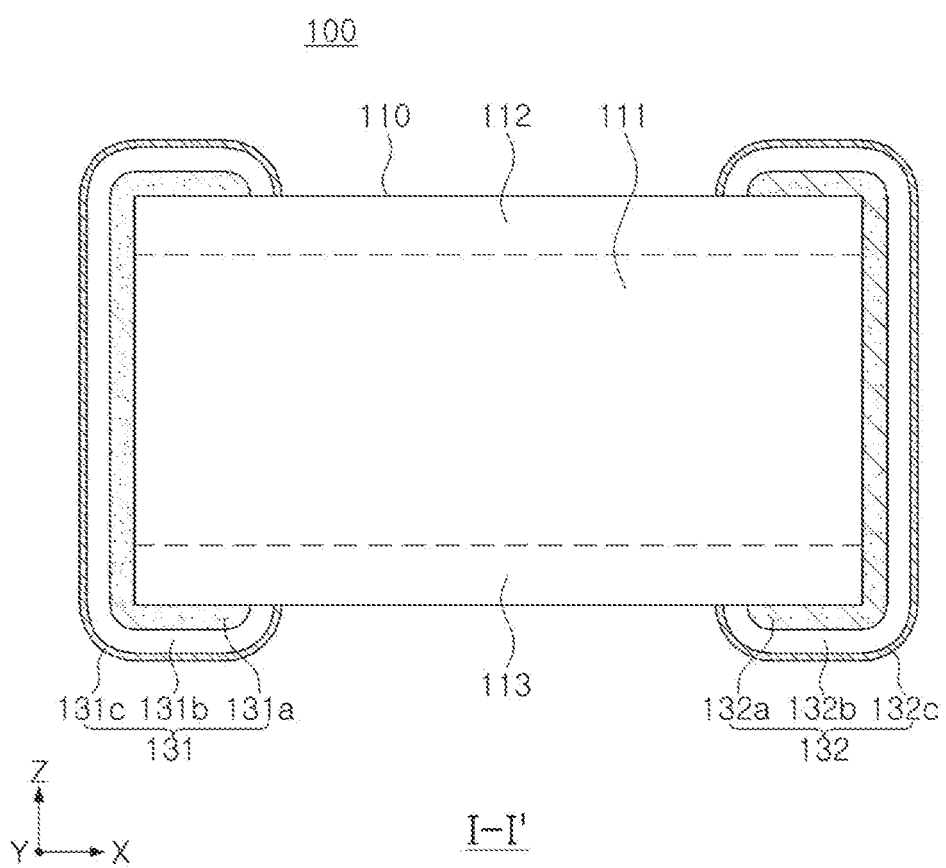
FIG. 2 is a cross-sectional view taken along line I-I' of FIG. 1.

FIG. 2 is a cross-sectional view taken along line I-I' of FIG. 1.

Figure 3:
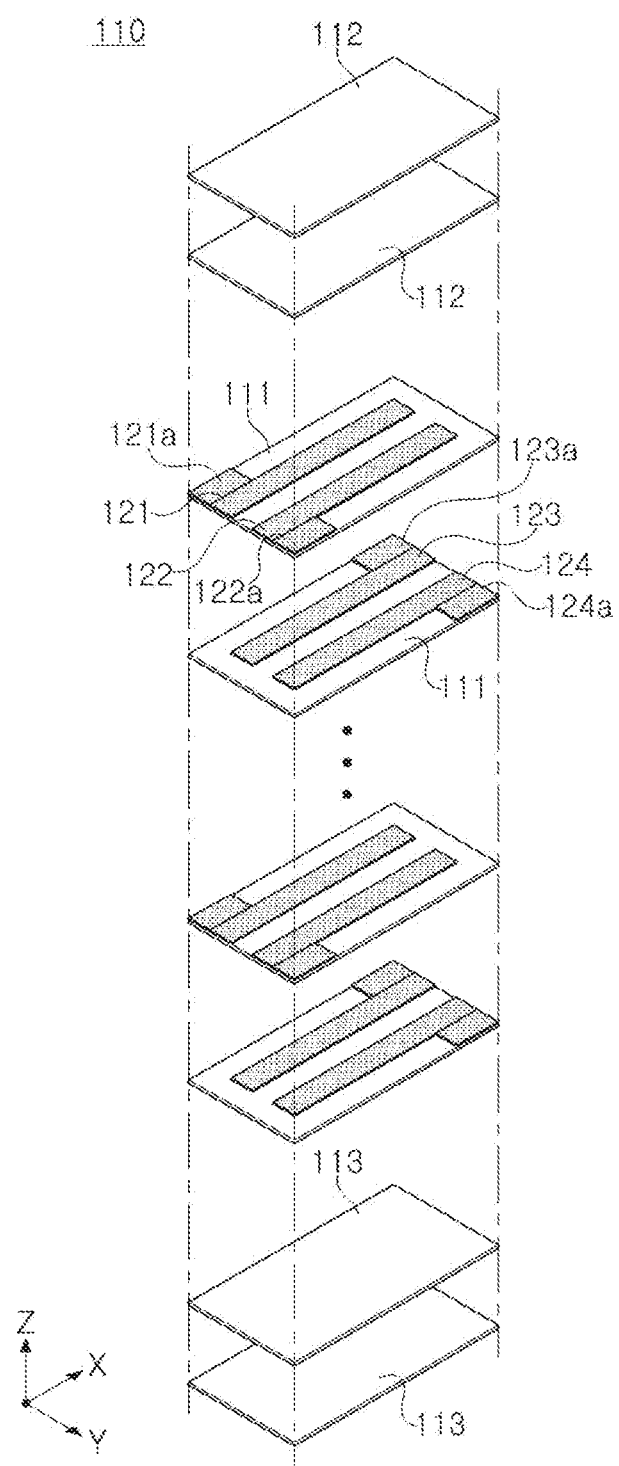
FIG. 3 is an exploded perspective view schematically illustrating an exploded body according to an embodiment of the present disclosure.

FIG. 3 is an exploded perspective view schematically illustrating an exploded body according to an embodiment of the present disclosure.

Figure 4:
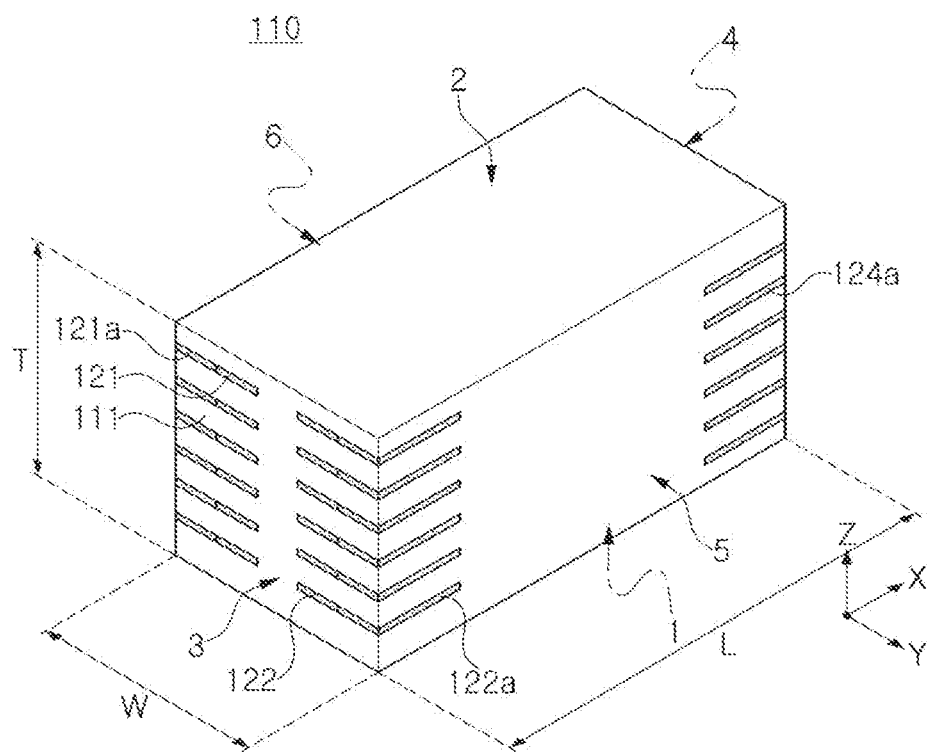
FIG. 4 is a perspective view illustrating the body of FIG. 1.

FIG. 4 is a perspective view illustrating the body of FIG. 1.

Figure 5:
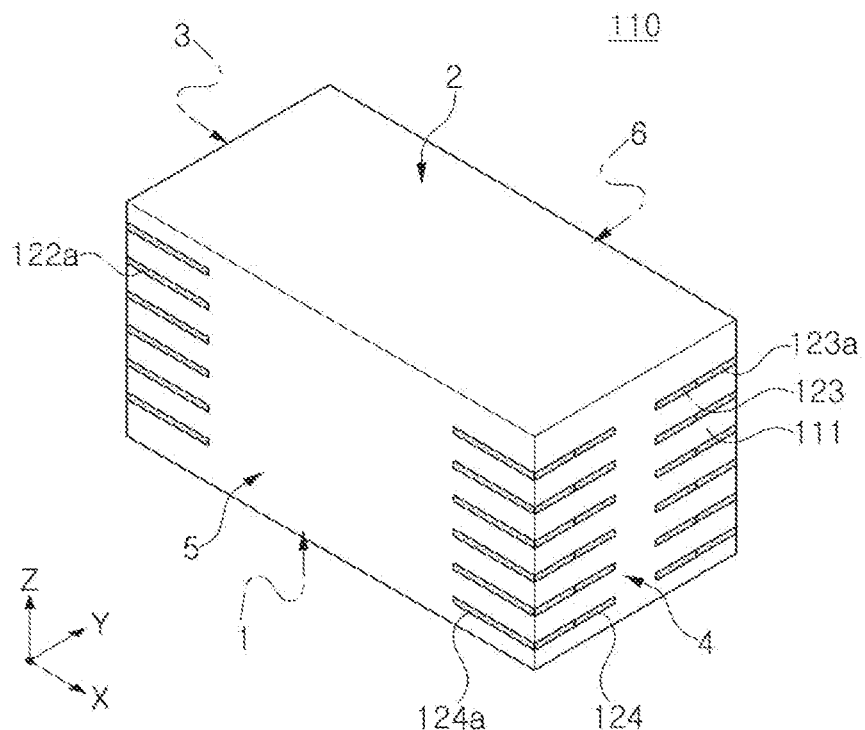
FIG. 5 is a perspective view of the body of FIG. 4, when viewed from another direction.

FIG. 5 is a perspective view of the body of FIG. 4, when viewed from another direction.

Figure 6:
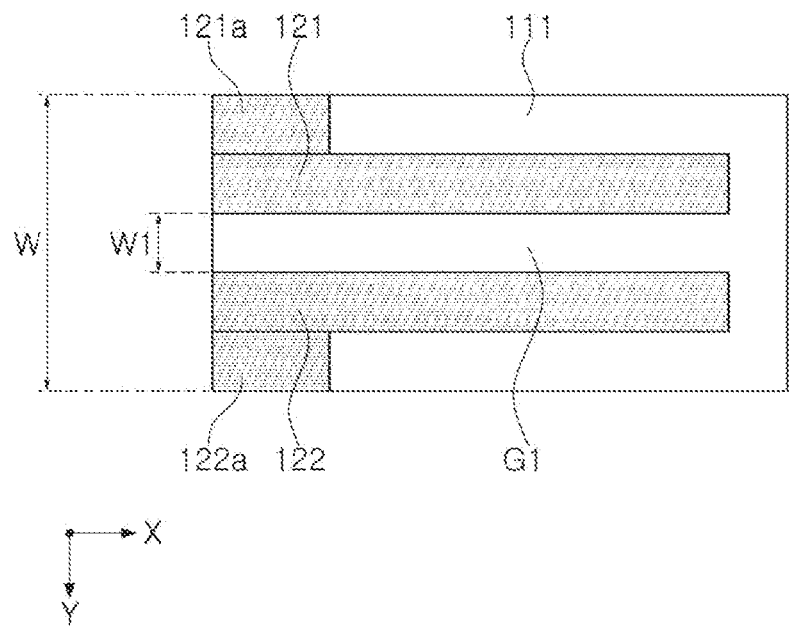
FIG. 6 is a plan view of a first internal electrode layer according to an embodiment of the present disclosure.

FIG. 6 is a plan view of a first internal electrode layer according to an embodiment of the present disclosure.

Figure 7:
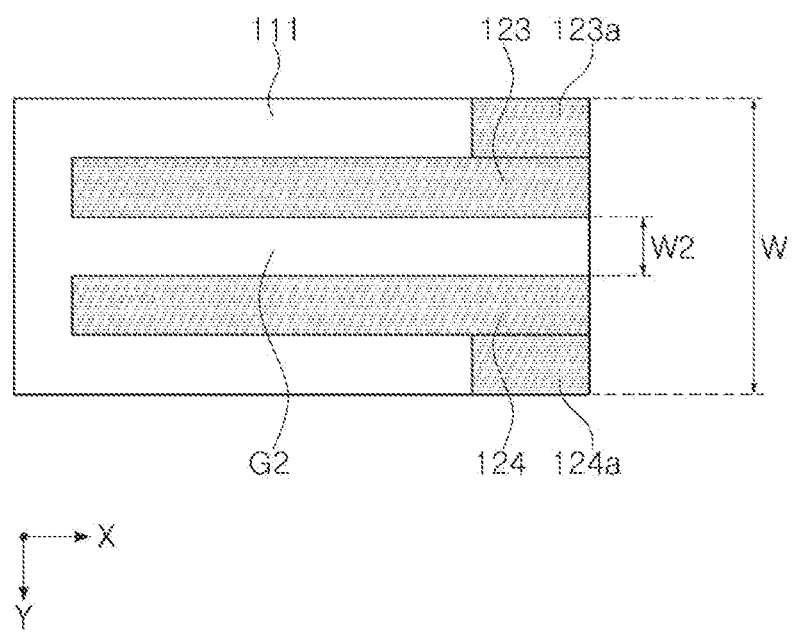
FIG. 7 is a plan view of a second internal electrode layer according to an embodiment of the present disclosure.

FIG. 7 is a plan view of a second internal electrode layer according to an embodiment of the present disclosure.

Hereinafter, a multilayer electronic component 100 according to an embodiment of the present disclosure will be described with reference to FIGS. 1 to 7.

A multilayer electronic component 100 according to an embodiment of the present disclosure may include a body 110 including dielectric layers 111, and first and second internal electrode layers alternately stacked in a stacking direction with respective dielectric layers interposed therebetween, and including first and second surfaces 1 and 2 opposing each other in the stacking direction, third and fourth surfaces 3 and 4 connected to the first and second surfaces and opposing each other, and fifth and sixth surfaces 5 and 6 connected to the first to fourth surfaces and opposing each other; and first and second external electrodes 131 and 132 arranged on the third and fourth surfaces, respectively. The first internal electrode layer includes first and second internal electrodes 121 and 122 exposed from the third surface 3 and arranged with a first spacer G1 interposed therebetween, a first lead portion 121a connected to the first internal electrode 121 and exposed from the third and sixth surfaces 3 and 6, and a second lead portion 122a connected to the second internal electrode 122 and exposed from the third and fifth surfaces 3 and 5, and the second internal electrode layer includes third and fourth internal electrodes 123 and 124 exposed from the fourth surface 4 and arranged with a second spacer G2 interposed therebetween, a third lead portion 123a connected to the third internal electrode 123 and exposed from the fourth and sixth surfaces 4 and 6, and a fourth lead portion 124a connected to the fourth internal electrode 124 and exposed from the fourth and fifth surfaces 4 and 5.

The body 110 may include the dielectric layers 111 and the first and second internal electrode layers alternately stacked with the respective dielectric layers 111 interposed therebetween.

Although the specific shape of the body 110 is not particularly limited, as illustrated, the body 110 may have a hexahedral shape or the like. Due to shrinkage of ceramic powder contained in the body 110 during a firing process, the body 110 may not have a perfectly hexahedral shape with completely straight lines, but may have a substantially hexahedral shape overall.

The body 110 may have the first and second surfaces 1 and 2 opposing each other in the thickness direction (the Z direction), the third and fourth surfaces 3 and 4 connected to the first and second surfaces 1 and 2 and opposing each other in the longitudinal direction (the X direction), and the fifth and sixth surfaces 5 and 6 connected to the first and second surfaces 1 and 2, connected to the third and fourth surfaces 3 and 4, and opposing each other in the width direction (the Y direction).

Referring to FIG. 4, a distance between the first surface 1 and the second surface 2 may be defined as a thickness T of the body, a distance between the third surface 3 and the fourth surface 4 may be defined as a length L of the body, and a distance between the fifth surface 5 and the sixth surface 6 may be defined as a width W of the body.

The plurality of dielectric layers 111 forming the body 110 may be in a fired state, and a boundary between adjacent dielectric layers 111 may not be apparent without using a scanning electron microscope (SEM).

According to one embodiment of the present disclosure, the raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, in which calcium (Ca), zirconium (Zr), or the like is partially dissolved into $BaTiO_3$, or the like.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 may include a capacity forming portion disposed in the body 110 and including the first and second internal electrode layers, disposed to oppose each other with the dielectric layer 111 interposed therebetween, to form capacity, an upper protective layer 112 disposed above the capacity forming portion, and a lower protective layer 113 disposed below the capacity forming portion.

The capacity forming portion may contribute to capacity formation of a capacitor, and may be formed by repeatedly stacking the plurality of first and second internal electrode layers with the dielectric layer 111 interposed therebetween.

The upper protective layer 112 and the lower protective layer 113 may be formed by stacking the single dielectric layer or the two or more dielectric layers on upper and lower surfaces of the capacity forming portion, respectively, in the vertical direction, and may basically play a role in preventing damage to the internal electrodes due to physical or chemical stress.

The upper protective layer 112 and the lower protective layer 113 may not include an internal electrode, and may include the same material as the dielectric layer 111.

Referring to FIGS. 4 to 7, the first internal electrode layer may include the first and second internal electrodes 121 and 122 exposed from the third surface 3 and arranged with the first spacer G1 interposed therebetween, the first lead portion 121a connected to the first internal electrode 121 and exposed from the third and sixth surfaces 3 and 6, and the second lead portion 122a connected to the second internal electrode 122 and exposed from the third and fifth surfaces 3 and 5.

The second internal electrode layer may include the third and fourth internal electrodes 123 and 124 exposed from the fourth surface 4 and arranged with the second spacer G2 interposed therebetween, the third lead portion 123a connected to the third internal electrode 123 and exposed from the fourth and sixth surfaces 4 and 6, and the fourth lead portion 124a connected to the fourth internal electrode 124 and exposed from the fourth and fifth surfaces 4 and 5.

The first and second spacers G1 and G2 may serve to improve mechanical strength. In addition, the first and second spacers G1 and G2 may serve to allow the dielectric to dominate the overall sintering force, rather than the internal electrode. Therefore, the occurrence of delamination and cracking may be suppressed effectively.

In a conventional multilayer electronic component having only one internal electrode in one internal electrode layer without the first and second spacers G1 and G2, there is a problem in that a delamination may occur or a cracking may occur in the plasticizing process.

This problem may occur because the internal electrode and the dielectric layer have materials different from each other and a bonding strength between the internal electrode and the dielectric layer is relatively low. Due to a limitation of the bonding force between the internal electrode and the dielectric layer, the delamination and cracking may occur due to friction in blades during a cutting process and collisions between chips during a green polishing process.

Since the first and second spacers G1 and G2 according to the present disclosure are included, the dielectric layers disposed above and below the first internal electrode layer may be connected to each other through the first spacer G1, and the dielectric layers disposed above and below the second internal electrode layer may be connected to each other through the second spacer G2. Therefore, it is possible to improve the mechanical strength of the chips by increasing a junction area between homogeneous materials. It is also possible to allow the dielectric to dominate the overall sintering force, rather than the internal electrode.

In addition, the dielectric layers disposed above and below the first internal electrode layer may be connected to each other by the first spacer G1 during stacking and pressing processes, and the dielectric layers disposed above and below the second internal electrode layer may be connected to each other by the second spacer G2. Therefore, the first and second spacers G1 and G2 may include a dielectric. In this case, the dielectric may be dispose in the first and second spacers G1 and G2.

Widths W1 and W2 of the first and second spacers G1 and G2 need not be particularly limited. For example, the widths W1 and W2 of the first and second spacers G1 and G2 may be 5% or more and 30% or less of the width W of the body, respectively.

When the widths W1 and W2 of the first and second spacers G1 and G2 are less than 5% of the width W of the body, the effect of improving the bonding force between the dielectric layers may be insufficient. When the widths W1 and W2 of the first and second spacers G1 and G2 exceed 30% of the width W of the body, an area of overlap between the internal electrodes may be reduced, thereby making it difficult to secure a high capacity.

The first to fourth lead portions 121a, 122a, 123a, and 124a may serve to improve connectivity between the internal electrodes 121, 122, 123, and 124 and the external electrodes 131 and 132.

Since the internal electrodes 121, 122, 123, and 124 are spaced apart by the spacers G1 and G2, contact areas between the internal electrodes 121, 122, 123, and 124 and the external electrodes 131 and 132 may be reduced, to deteriorate the connectivity between the internal electrodes 121, 122, 123, and 124 and the external electrodes 131, 132. According to the present disclosure, since the first to fourth lead portions 121a, 122a, 123a, and 124a may be connected to each of the internal electrodes and arranged at one corner of the body, the connectivity between the internal electrodes 121, 122, 123, and 124 and the external electrodes 131 and 132 may be improved, and an equivalent series resistance (ESR) may be lowered.

The first and second internal electrodes 121 and 122 may be spaced apart from the fourth surface 4 and may be exposed from the third surface 3, and the third and fourth internal electrodes 123 and 124 may be spaced apart from the third surface 3 and may be exposed from the fourth surface 4.

The first external electrode 131 may be disposed on the third surface 3 of the body to be connected to the first and second internal electrodes 121 and 122 and the first and second lead portions 121a and 122a. The second external electrode 132 may be disposed on the fourth surface 4 to be connected to the third and fourth internal electrodes 123 and 124 and the third and fourth lead portions 123a and 124a.

The first internal electrode layer and the second internal electrode layer may be electrically separated from each other by the dielectric layer 111 disposed therebetween.

Referring to FIG. 3, the body 110 may be formed by alternately stacking the dielectric layer 111 on which the first internal electrode layer is printed, and the dielectric layer 111 on which the second internal electrode layer is printed, in the thickness direction (the Z direction), and then firing the same.

A material for forming the first to fourth internal electrodes 121, 122, 123, and 124 is not particularly limited. For example, the first and second internal electrodes 121 and 122 may be formed by using a conductive paste containing one or more of nickel (Ni), copper (Cu), palladium (Pd), silver (Ag), gold (Au), platinum (Pt), tin (Sn), tungsten (W), titanium (Ti), and alloys thereof.

As a printing method of the conductive paste, a screen-printing method or a gravure printing method may be used, but the present disclosure is not limited thereto.

As illustrated in FIGS. 3 to 5, the first spacer G1 and the second spacer G2 may be stacked to overlap each other. In addition, in order to compensate for a step difference caused by thicknesses of the internal electrodes, the first spacer G1 and the second spacer G2 may be also stacked to partially overlap each other.

Also, referring to FIG. 2, as the first spacer G1 and the second spacer G2 are arranged in a central portion in the width direction and stacked to overlap each other, the internal electrode may not be observed in a cross-section in the length and thickness directions, cut in the central portion in the width direction.

The first external electrode 131 may be disposed on the third surface 3 of the body to be connected to the first and second internal electrodes 121 and 122 and the first and second lead portions 121a and 122a. The second external electrode 132 may be disposed on the fourth surface 4 to be connected to the third and fourth internal electrodes 123 and 124 and the third and fourth lead portions 123a and 124a.

The first external electrode 131 may be disposed to extend from the third surface 3 to a portion of the fifth and sixth surfaces 5 and 6, and the second external electrode 132 may be disposed to extend from the fourth surface 4 to a portion of the fifth and sixth surfaces 5 and 6. In addition, the first external electrode 131 may be disposed to extend from the third surface 3 to a portion of the first, second, fifth, and sixth surfaces 1, 2, 5, and 6, and the second external electrode 132 may be disposed to extend from the fourth surface 4 to a portion of the first, second, fifth, and sixth surfaces 1, 2, 5, and 6.

In this case, a portion in which the external electrodes 131 and 132 are arranged to extend to the first, second, fifth, and sixth surfaces 1, 2, 5, and 6 may be defined as a bent portion of the external electrodes 131 and 132.

The bent portion of the first external electrode 131 may contact the first and second lead portions 121a and 122a, and the bent portion of the second external electrode 132 may contact the third and fourth lead portions 123a and 124a. As a result, the connectivity between the internal electrodes 121, 122, 123, and 124 and the external electrodes 131 and 132 may be improved, and the equivalent series resistance (ESR) may be lowered.

The external electrodes 131 and 132 may be formed using any material, as long as they have electrical conductivity such as a metal. In addition, a specific material may be selected as the external electrodes 131 and 132 in consideration of electrical characteristics, structural stability, or the like. Furthermore, the external electrodes 131 and 132 may have a multilayer structure.

For example, the external electrodes 131 and 132 may be sintered electrodes including a conductive metal and a glass, or resin-based electrodes including a conductive metal and a resin.

In addition, the external electrodes 131 and 132 may be formed using an atomic layer deposition (ALD) process, a molecular layer deposition (MLD) process, a chemical vapor deposition (CVD) process, a sputtering process, or the like.

In addition, the external electrodes 131 and 132 may be formed by transferring a sheet including a conductive metal on the body 110.

Referring to FIG. 2, as a specific example of the external electrodes 131 and 132, the external electrodes 131 and 132 may respectively include electrode layers 131a and 132a, conductive resin layers 131b and 132b, and plating layers 131c and 132c, sequentially arranged on the body 110.

In this case, the electrode layers 131a and 132a may include a conductive metal and glass.

The conductive metals included in the electrode layers 131a and 132a are not particularly limited, as long as they are materials that may be electrically connected to the internal electrodes to form capacitance. For example, the conductive metals used for the electrode layers 131a and 132a may be one or more of nickel (Ni), copper (Cu), palladium (Pd), silver (Ag), gold (Au), platinum (Pt), tin (Sn), tungsten (W), titanium (Ti), and alloys thereof.

A glass frit may be added to a conductive metal powder to prepare a conductive paste, and, then, the prepared conductive paste may be sintered to form the electrode layers 131a and 132a.

In addition, the conductive resin layers 131b and 132b may include conductive metals and base resins.

The conductive metals included in the conductive resin layers 131b and 132b may serve to be electrically connected to the electrode layers 131a and 132a.

The conductive metals included in the conductive resin layers 131b and 132b are not particularly limited, as long as they are materials that may be electrically connected to the electrode layers 131a and 132a. For example, the conductive metals included in the conductive resin layers 131b and 132b may be one or more of nickel (Ni), copper (Cu), palladium (Pd), silver (Ag), gold (Au), platinum (Pt), tin (Sn), tungsten (W), titanium (Ti), and alloys thereof.

The base resins contained in the conductive resin layers 131b and 132b may play a role of securing bonding properties and absorbing impact.

The base resins contained in the conductive resin layers 131b and 132b are not particularly limited, as long as they have bonding properties and impact absorbing properties, and may be mixed with the conductive metal powder to form a paste. For example, the base resins may be epoxy-based resins.

In addition, types of the plating layers 131c and 132c are not particularly limited. For example, the plating layers 131c and 132c may be plating layers containing one or more of nickel (Ni), tin (Sn), palladium (Pd), and alloys thereof, and may be formed of a plurality of layers.

Figure 8:
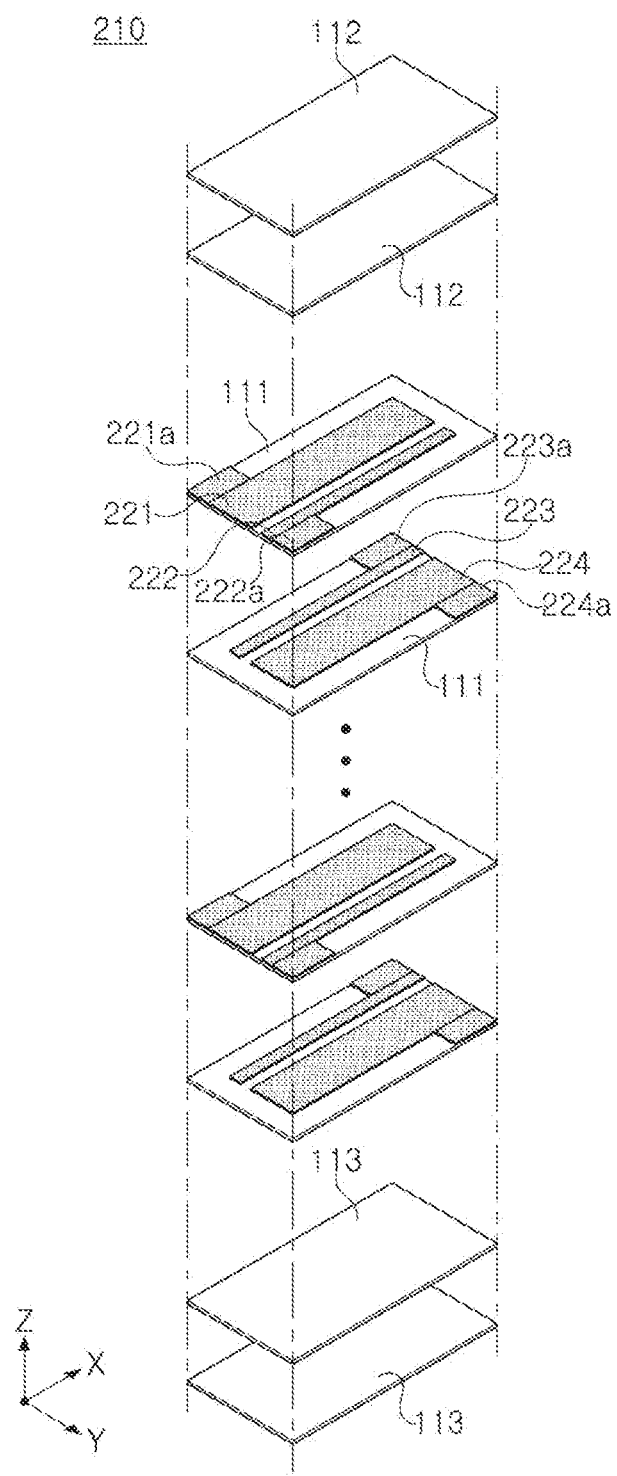
FIG. 8 is an exploded perspective view schematically illustrating an exploded body according to a first modification of the present disclosure.

FIG. 8 is an exploded perspective view schematically illustrating an exploded body according to a first modification of the present disclosure.

Figure 9:
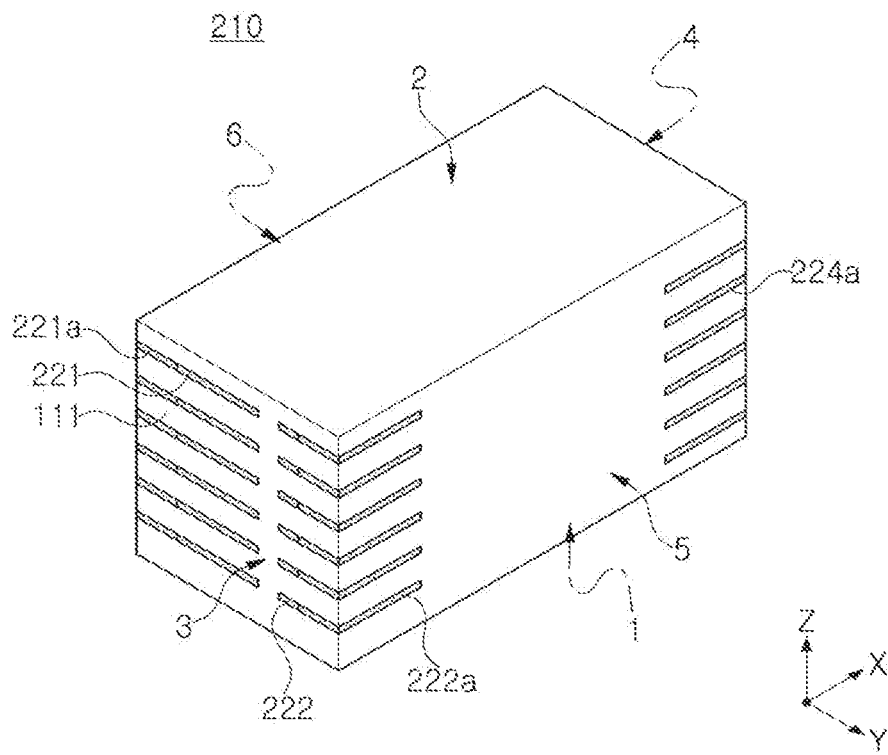
FIG. 9 is a perspective view of a body according to a first modification of the present disclosure.

FIG. 9 is a perspective view of a body according to a first modification of the present disclosure.

Figure 10:
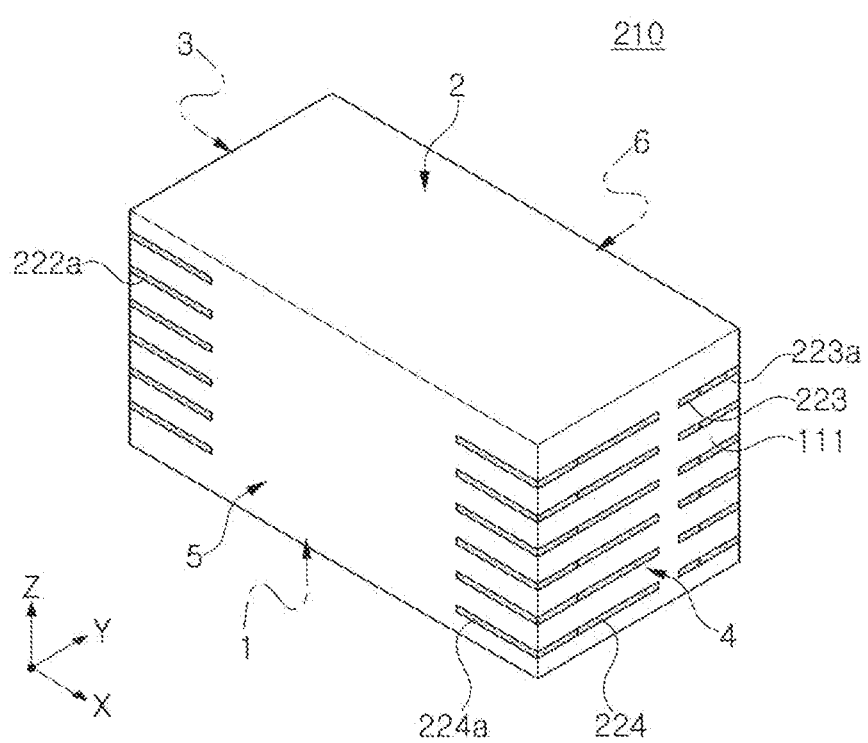
FIG. 10 is a perspective view of the body of FIG. 9, when viewed from another direction.

FIG. 10 is a perspective view of the body of FIG. 9, when viewed from another direction.

Figure 11:
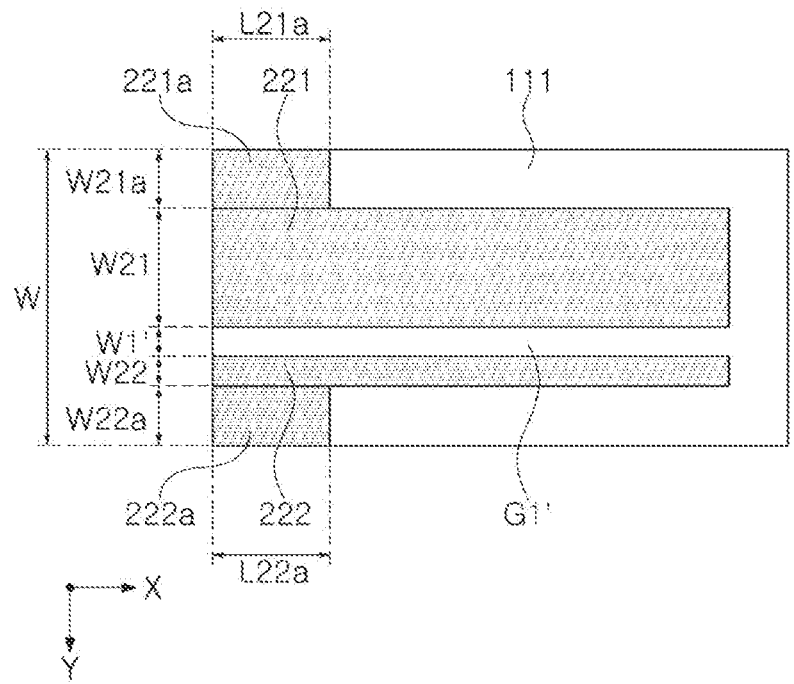
FIG. 11 is a plan view of a first internal electrode layer according to a first modification of the present disclosure.

FIG. 11 is a plan view of a first internal electrode layer according to a first modification of the present disclosure.

Figure 12:
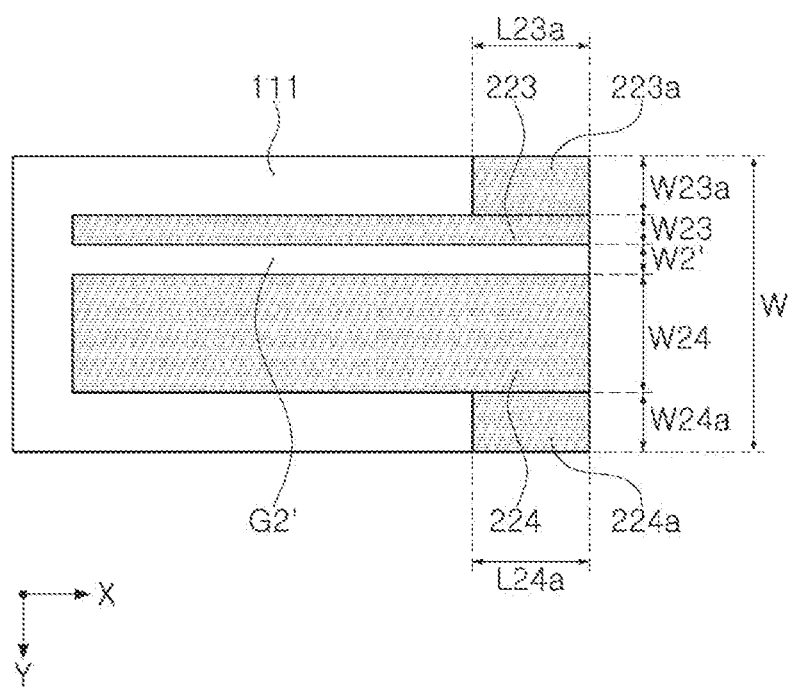
FIG. 12 is a plan view of a second internal electrode layer according to a first modification of the present disclosure.

FIG. 12 is a plan view of a second internal electrode layer according to a first modification of the present disclosure.

Referring to FIGS. 8 to 12, a first spacer G1' and a second spacer G2' may be stacked not to overlap each other.

When the first spacer and the second spacer are stacked to overlap each other, a shape of a body may be uneven because step differences caused by thicknesses of the internal electrodes are overlapped each other. According to the first modification of the present disclosure, since the first spacer G1' and the second spacer G2' are stacked so as not to overlap each other, even while the effect of improving the bonding force between the dielectric layers by the spacers may be maintained, it is possible to compensate for a step difference caused by thicknesses of the internal electrodes and to prevent a shape of the body 210 from being uneven.

In this case, a width W21 of a first internal electrode 221 and a width W22 of a second internal electrode 222 may be different from each other, and a width W23 of a third internal electrode 223 and a width W24 of a fourth internal electrode 224 may be different from each other.

Therefore, the first spacer G1' and the second spacer G2' may stacked not to overlap each other, while an area in which the first and second internal electrodes 221 and 222 and the third and fourth internal electrodes 223 and 224 overlap is maintained. Therefore, it is possible to compensate for the step difference caused by the internal electrode thickness while maintaining the capacity of the capacitor.

In this case, widths W21a, W22a, W23a, and W24a of first to fourth lead portions may be equal to each other, to maximize the area of overlap of the first and second internal electrodes 221 and 222 and the third and fourth internal electrodes 223 and 224.

Lengths L21a, L22a, L23a, and L24a of the first to fourth lead portions are not particularly limited, as long as the first to fourth lead portions do not directly contact each other. For example, the lengths L21a, L22a, L23a, and L24a of the first to fourth lead portions may be shorter than lengths of bent portions of external electrodes 131 and 132.

Figure 13:
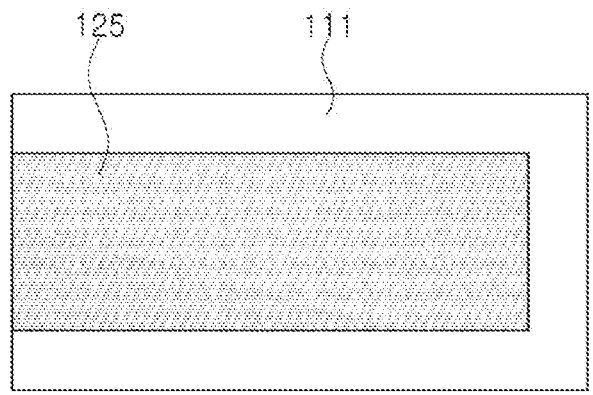
FIG. 13 is a plan view of a third internal electrode layer included in a second modification of the present disclosure.

FIG. 13 is a plan view of a third internal electrode layer included in a second modification of the present disclosure.

Figure 14:
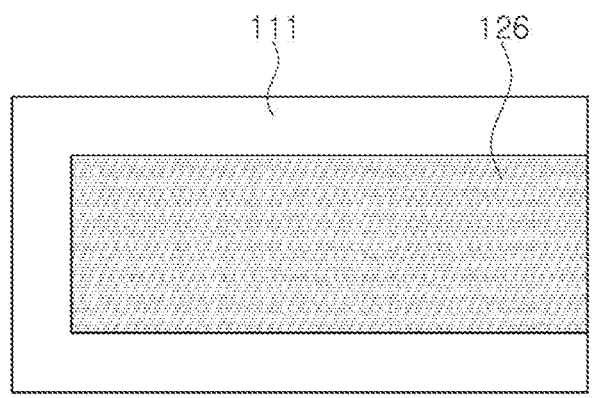
FIG. 14 is a plan view of a fourth internal electrode layer included in a second modification of the present disclosure.

FIG. 14 is a plan view of a fourth internal electrode layer included in a second modification of the present disclosure.

Referring to FIGS. 13 and 14, a body 110 according to a second modification of the present disclosure may further include at least one of a third internal electrode layer including a fifth internal electrode 125 exposed from the third surface 3, and a fourth internal electrode layer including a sixth internal electrode 126 exposed from the fourth surface 4. The fifth and sixth internal electrodes 125 and 126 may have a shape of an internal electrode included in a conventional multilayer capacitor, with reference to the structure of the body disclosed above and the structure of the body to be disclosed below.

Since the fifth internal electrode 125 and the sixth internal electrode 126 may be arranged to oppose each other with a dielectric layer 111 interposed therebetween, the fifth internal electrode 125 and the sixth internal electrode 126 may serve to further improve the capacity of the multilayer electronic component according to the present disclosure.

Figure 15:
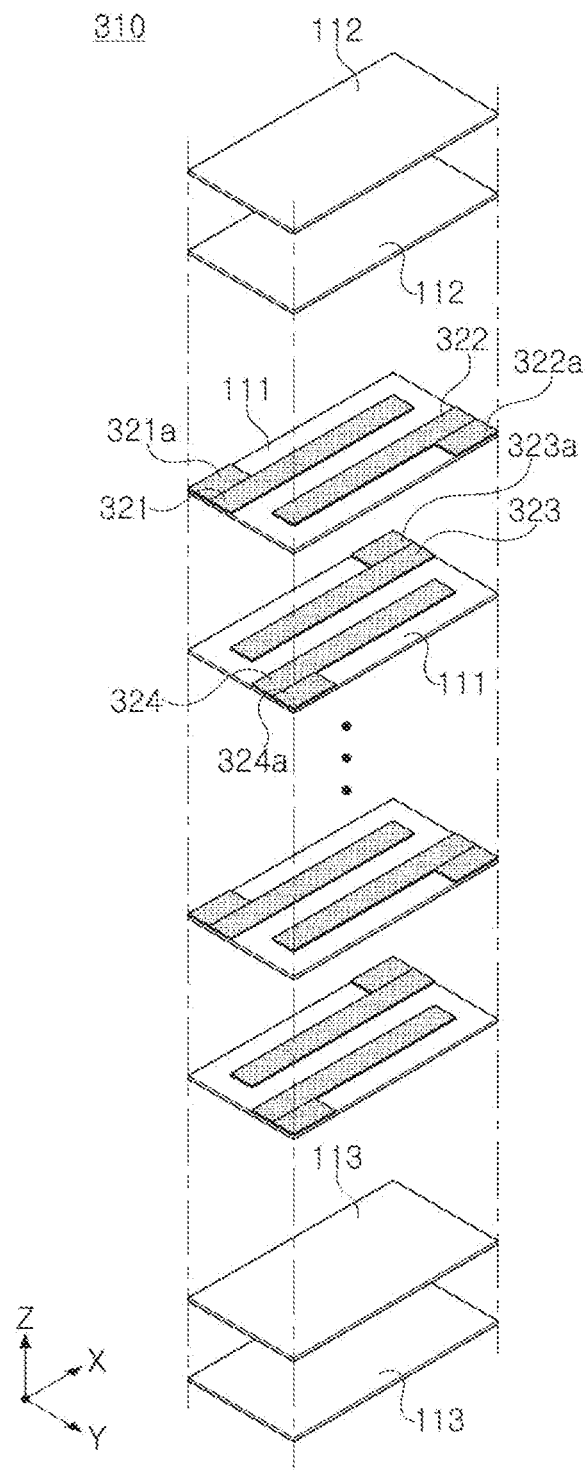
FIG. 15 is an exploded perspective view schematically illustrating an exploded body of a multilayer electronic component according to another embodiment of the present disclosure.

FIG. 15 is an exploded perspective view schematically illustrating an exploded body of a multilayer electronic component according to another embodiment of the present disclosure.

Figure 16:
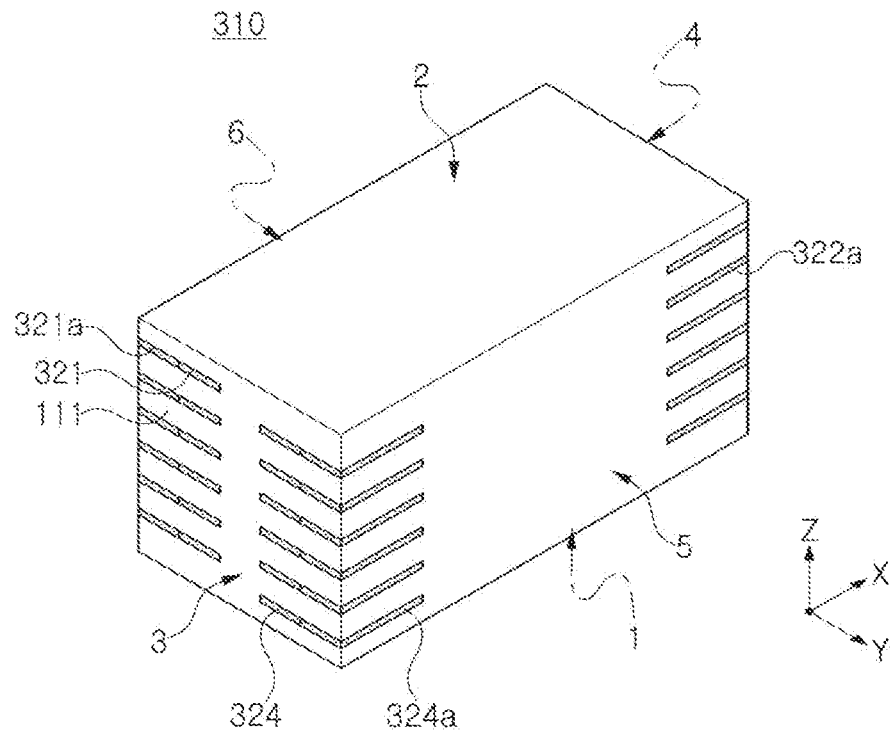
FIG. 16 is a perspective view illustrating a body of a multilayer electronic component according to another embodiment of the present disclosure.

FIG. 16 is a perspective view illustrating a body of a multilayer electronic component according to another embodiment of the present disclosure.

Figure 17:
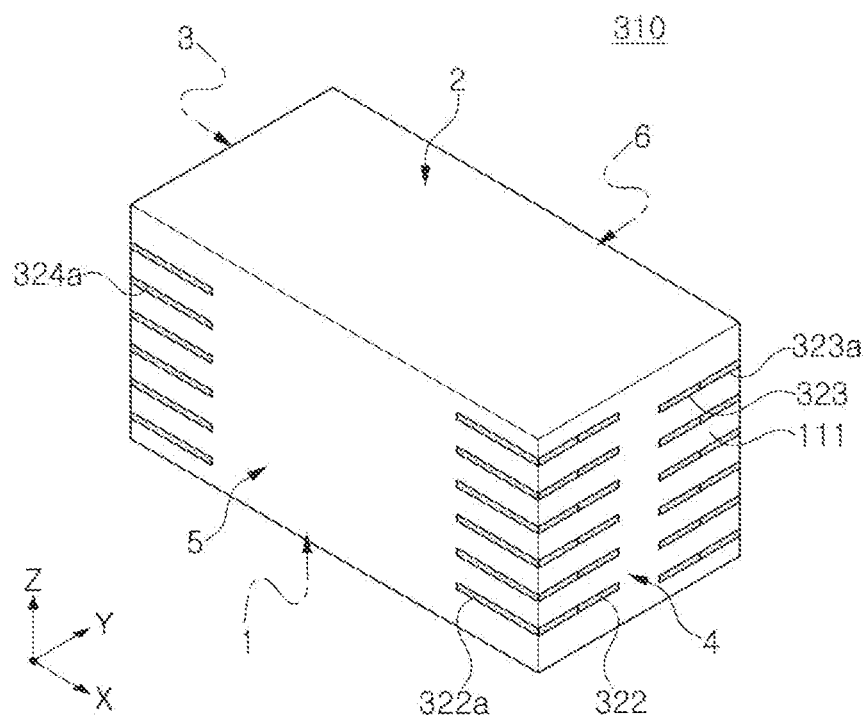
FIG. 17 is a perspective view of the body of FIG. 16, when viewed from another direction.

FIG. 17 is a perspective view of the body of FIG. 16, when viewed from another direction.

Figure 18:
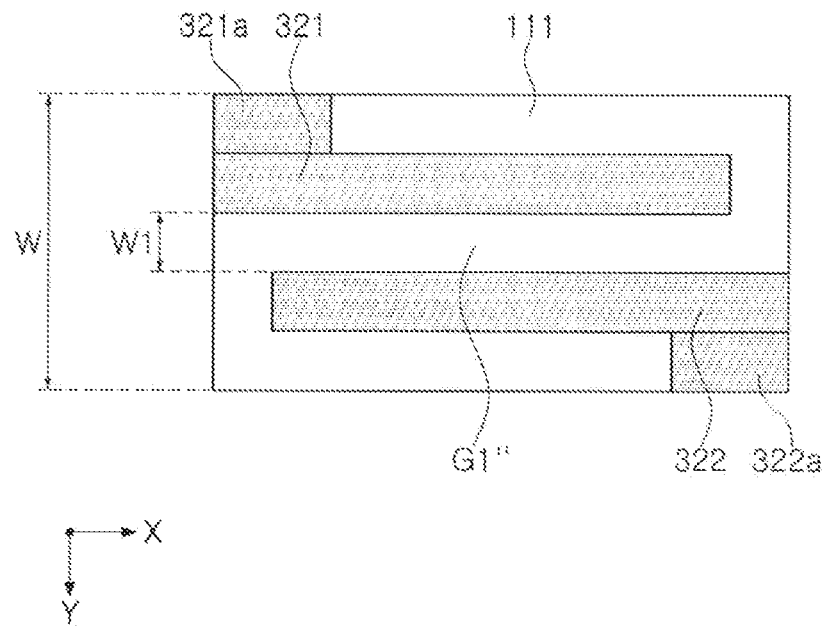
FIG. 18 is a plan view of a first internal electrode layer according to another embodiment of the present disclosure.

FIG. 18 is a plan view of a first internal electrode layer according to another embodiment of the present disclosure.

Figure 19:
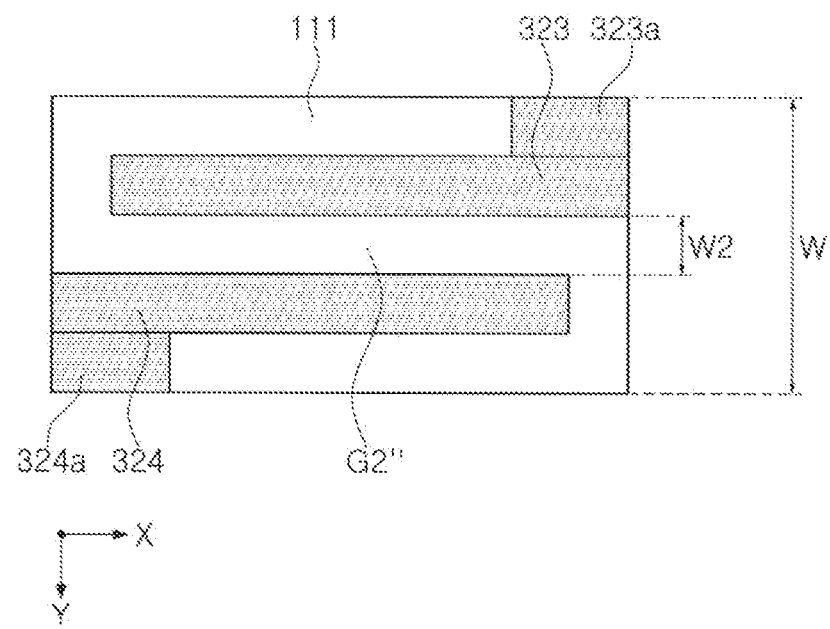
FIG. 19 is a plan view of a second internal electrode layer according to another embodiment of the present disclosure.

FIG. 19 is a plan view of a second internal electrode layer according to another embodiment of the present disclosure.

Hereinafter, a multilayer electronic component according to another embodiment of the present disclosure will be described with reference to FIGS. 15 to 19. However, in order to avoid overlapping descriptions, descriptions common to the multilayer electronic component 100 according to the embodiment of the present disclosure may be omitted.

An external electrode of a multilayer electronic component according to another embodiment of the present disclosure may have the same form as the external electrodes 131 and 132 of the multilayer electronic component 100 according to an embodiment of the present disclosure, and a perspective view of a multilayer electronic component according to another embodiment of the present disclosure may be the same as that of FIG. 1.

A multilayer electronic component according to another embodiment of the present disclosure may include a body 310 including dielectric layers 111, and first and second internal electrode layers alternately stacked in a stacking direction with respective dielectric layers interposed therebetween, and including first and second surfaces 1 and 2 opposing each other in the stacking direction, third and fourth surfaces 3 and 4 connected to the first and second surfaces and opposing each other, and fifth and sixth surfaces 5 and 6 connected to the first to fourth surfaces and opposing each other; and first and second external electrodes 131 and 132 arranged on the third and fourth surfaces, respectively. The first internal electrode layer includes first and second internal electrodes 321 and 322 exposed from the third surface and arranged with a first spacer G1" interposed therebetween, a first lead portion 321a connected to the first internal electrode and exposed from the third and sixth surfaces 3 and 6, and a second lead portion 322a connected to the second internal electrode and exposed from the fourth and fifth surfaces 4 and 6, and the second internal electrode layer includes third and fourth internal electrodes 323 and 324 exposed from the fourth surface and arranged with a second spacer G2" interposed therebetween, a third lead portion 323a connected to the third internal electrode and exposed from the fourth and sixth surfaces 4 and 6, and a fourth lead portion 324a connected to the fourth internal electrode and exposed from the third and fifth surfaces 3 and 5. The first and fourth internal electrodes 321 and 324 are exposed from the third surface 3, and the second and third internal electrodes 322 and 323 are exposed from the fourth surface 4.

The first internal electrode layer may include the first and second internal electrodes 321 and 322 arranged with the first spacer G1" interposed therebetween, the first lead portion 321a connected to the first internal electrode 321 and exposed from the third and sixth surfaces 3 and 6, and the second lead portion 322a connected to the second internal electrode 322 and exposed from the fourth and fifth surfaces 4 and 5.

The first internal electrode 321 may be exposed from the third surface 3 to be connected to the first external electrode 131, and the second internal electrode 322 may be exposed from the fourth surface 4 to be connected to the second external electrode 132.

Since the first and second internal electrodes 321 and 322 are arranged with the first spacer G1" interposed therebetween, and thus are not electrically connected to each other, the first internal electrode 321 and the second internal electrode 322 included in the first internal electrode layer may have different polarities.

The second internal electrode layer may include the third and fourth internal electrodes 323 and 324 arranged with the second spacer G2" interposed therebetween, the third lead portion 323a connected to the third internal electrode 323 and exposed from the fourth and sixth surfaces 4 and 6, and the fourth lead portion 324a connected to the fourth internal electrode 324 and exposed from the third and fifth surfaces 3 and 5.

The third internal electrode 323 may be exposed from the fourth surface 4 to be connected to the second external electrode 132, and the fourth internal electrode 324 may be exposed from the third surface 3 to be connected to the first external electrode 131.

Since the third and fourth internal electrodes 323 and 324 are arranged with the second spacer G2" interposed therebetween, and thus are not electrically connected to each other, the third internal electrode 323 and fourth internal electrode 324 included in the second internal electrode layer may have different polarities.

In the conventional capacitor, internal electrodes having different polarities may be arranged only above and below the other internal electrodes. In a multilayer electronic component according to another embodiment of the present disclosure, the capacity may be improved as internal electrodes having different polarities may be arranged not only on above and below the other internal electrodes but also on side surfaces of the other internal electrodes.

Referring to FIGS. 15 to 17, it can be seen that the third internal electrodes 323 having different polarities may be arranged above and below the first internal electrode 321, and the second internal electrodes 322 having different polarities may be arranged on side surfaces of the first internal electrode 321.

Similarly, the second internal electrodes 322 having different polarities may be arranged above and below the fourth internal electrode 324, and the third internal electrodes 323 having different polarities may be arranged on side surfaces of the fourth internal electrode 324.

The first external electrode 131 may be disposed on the third surface 3 of the body to be connected to the first and fourth internal electrodes 321 and 324 and the first and fourth lead portions 321a and 324a. The second external electrode 132 may be disposed on the fourth surface 4 of the body to be connected to the second and third internal electrodes 322 and 323 and the second and third lead portions 322a and 323a.

In addition, since a bent portion of the first external electrode 131 contacts the first and fourth lead portions 321a and 324a, and a bent portion of the second external electrode 132 contacts the second and third lead portions 322a and 323a, connectivity between the internal electrodes 321, 322, 323, and 324 and the external electrodes 131 and 132 may be improved, and an equivalent series resistance (ESR) may be lowered.

One of various effects of the present disclosure is to secure a good mechanical strength by disposing the spacer in the central portion of the internal electrode layer.

One of various effects of the present disclosure is to improve the reliability for moisture resistance.

One of various effects of the present disclosure is to suppress the occurrence of delamination of the capacity forming portion and the cover portion, the occurrence of cracking, or the like.

One of various effects of the present disclosure is to prevent the poor contact between the internal electrode and the external electrode.

However, various and advantageous advantages and effects of the present disclosure are not limited to the above description, and can be more readily understood in the process of describing the specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body comprising dielectric layers, and first and second internal electrode layers alternately stacked in a stacking direction with respective dielectric layers interposed therebetween, and comprising first and second surfaces opposing each other in the stacking direction, third and fourth surfaces connected to the first and second surfaces and opposing each other, and fifth and sixth surfaces connected to the first to fourth surfaces and opposing each other;
a first external electrode disposed to extend from the third surface to a portion of the fifth and sixth surfaces; and
a second external electrode disposed to extend from the fourth surface to a portion of the fifth and sixth surfaces,
wherein the first internal electrode layer comprises first and second internal electrodes connected to the first external electrode on the third surface, a first lead portion connected to the first internal electrode and connected to the first external electrode on the third and sixth surfaces, and a second lead portion connected to the second internal electrode and connected to the first external electrode on the third and fifth surfaces,
wherein the second internal electrode layer comprises third and fourth internal electrodes connected to the second external electrode on the fourth surface, a third lead portion connected to the third internal electrode and connected to the second external electrode on the fourth and sixth surfaces, and a fourth lead portion connected to the fourth internal electrode and connected to the second external electrode on the fourth and fifth surfaces, and wherein the first lead portion and the second lead portion are spaced apart from each other and the third lead portion and the fourth lead portion are spaced apart from each other.

2. The multilayer electronic component according to claim 1, first and second internal electrodes are arranged with a first spacer interposed between first and second internal electrodes and third and fourth internal electrodes are arranged with a second spacer interposed therebetween.

3. The multilayer electronic component according to claim 2, wherein the dielectric layers disposed above and below the first internal electrode layer are connected to each other by the first spacer, and the dielectric layers disposed above and below the second internal electrode layer are connected to each other by the second spacer.

4. The multilayer electronic component according to claim 2, wherein a dielectric is disposed in the first and second spacers.

5. The multilayer electronic component according to claim 2, wherein a width of the first spacer is 5% or more and 30% or less of a width of the body, and a width of the second spacer is 5% or more and 30% or less of the width of the body.

6. The multilayer electronic component according to claim 2, wherein the first spacer and the second spacer are stacked not to overlap each other in the stacking direction.

7. The multilayer electronic component according to claim 1, wherein widths of the first and second internal electrodes are different from each other, and widths of the third and fourth internal electrodes are different from each other.

8. The multilayer electronic component according to claim 1, wherein the body further comprises at least one of a third internal electrode layer comprising a fifth internal electrode exposed from the third surface, and a fourth internal electrode layer comprising a sixth internal electrode exposed from the fourth surface.

9. The multilayer electronic component according to claim 8, wherein the fifth internal electrode is the only internal electrode included in the third internal electrode layer, and the sixth internal electrode is the only internal electrode included in the fourth internal electrode layer.

10. A multilayer electronic component comprising:

a body comprising dielectric layers, and first and second internal electrode layers alternately stacked in a stacking direction with respective dielectric layers interposed therebetween, and comprising first and second surfaces opposing each other in the stacking direction, third and fourth surfaces connected to the first and second surfaces and opposing each other, and fifth and sixth surfaces connected to the first to fourth surfaces and opposing each other;

a first external electrode disposed to extend from the third surface to a portion of the fifth and sixth surfaces; and a second external electrode disposed to extend from the fourth surface to a portion of the fifth and sixth surfaces, wherein the first internal electrode layer comprises first and second internal electrodes, a first lead portion connected to the first internal electrode and connected to the first external electrode on the third and sixth surfaces, and a second lead portion connected to the second internal electrode and connected to the second external electrode on the fourth and fifth surfaces, wherein the second internal electrode layer comprises third and fourth internal electrodes, a third lead portion connected to the third internal electrode and connected to the second external electrode on the fourth and sixth surfaces, and a fourth lead portion connected to the fourth internal electrode and connected to the first external electrode on the third and fifth surfaces, wherein the first and fourth internal electrodes are connected to the first external electrode on the third surface, and the second and third internal electrodes are connected to the second external electrode on the fourth surface wherein the first lead portion and the second lead portion are spaced apart from each other and the third lead portion and the fourth lead portion are spaced apart from each other.

11. The multilayer electronic component according to claim 10, first and second internal electrodes are arranged with a first spacer interposed between first and second internal electrodes and third and fourth internal electrodes are arranged with a second spacer interposed therebetween.

12. The multilayer electronic component according to claim 11, wherein the dielectric layers disposed above and below the first internal electrode layer are connected to each other by the first spacer, and the dielectric layers disposed above and below the second internal electrode layer are connected to each other by the second spacer.

13. The multilayer electronic component according to claim 11, wherein a dielectric is disposed in the first and second spacers.

14. The multilayer electronic component according to claim 11, wherein a width of the first spacer is 5% or more and 30% or less of a width of the body, and a width of the second spacer is 5% or more and 30% or less of the width of the body.

15. The multilayer electronic component according to claim 11, wherein the first spacer and the second spacer are stacked not to overlap each other in the stacking direction.

16. The multilayer electronic component according to claim 10, wherein widths of the first and second internal electrodes are different from each other, and widths of the third and fourth internal electrodes are different from each other.

17. The multilayer electronic component according to claim 10, wherein the body further comprises at least one of a third internal electrode layer comprising a fifth internal electrode exposed from the third surface, and a fourth internal electrode layer comprising a sixth internal electrode exposed from the fourth surface.

18. The multilayer electronic component according to claim 10, wherein the fifth internal electrode is the only internal electrode included in the third internal electrode layer, and the sixth internal electrode is the only internal electrode included in the fourth internal electrode layer.

* * * * *